(12) United States Patent
Pizot et al.

(10) Patent No.: US 12,476,813 B2
(45) Date of Patent: Nov. 18, 2025

(54) PUBLIC KEY SERVICE FOR MESSAGE AUTHENTICATION

(71) Applicant: Hewlett-Packard Development Company, L.P., Spring, TX (US)

(72) Inventors: Laurent Pizot, Vancouver, WA (US); Thalia May Laing, Bristol (GB); Stephen D. Panshin, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 49 days.

(21) Appl. No.: 18/608,681

(22) Filed: Mar. 18, 2024

(65) Prior Publication Data

US 2025/0293859 A1 Sep. 18, 2025

(51) Int. Cl.
*H04L 9/32* (2006.01)
*H04L 9/08* (2006.01)
*H04L 9/40* (2022.01)

(52) U.S. Cl.
CPC .......... *H04L 9/3228* (2013.01); *H04L 9/0825* (2013.01); *H04L 9/0869* (2013.01); *H04L 9/3247* (2013.01); *H04L 9/083* (2013.01); *H04L 9/0863* (2013.01); *H04L 63/062* (2013.01); *H04L 63/067* (2013.01)

(58) Field of Classification Search
CPC ....... H04L 9/08; H04L 9/0825; H04L 9/0869; H04L 9/0816; H04L 9/0819; H04L 9/0861; H04L 9/0863; H04L 9/083; H04L 9/32; H04L 9/3228; H04L 9/3247; H04L 63/06; H04L 63/062; H04L 63/067
See application file for complete search history.

(56) References Cited

U.S. PATENT DOCUMENTS

| | | | |
|---|---|---|---|
| 11,184,157 B1* | 11/2021 | Gueron | H04L 9/14 |
| 12,321,580 B2* | 6/2025 | Wang | G06F 3/04847 |
| 2016/0218879 A1 | 7/2016 | Ferrin | |
| 2018/0337772 A1 | 11/2018 | Acar et al. | |
| 2020/0387639 A1 | 12/2020 | Hummel et al. | |
| 2021/0176072 A1* | 6/2021 | Chalkias | H04L 9/50 |
| 2022/0086009 A1* | 3/2022 | Vacek | H04L 9/0877 |
| 2022/0224548 A1 | 7/2022 | Mondello et al. | |
| 2025/0132936 A1 | 4/2025 | Kanovitz et al. | |
| 2025/0300812 A1* | 9/2025 | Azouaoui | H04L 9/085 |

* cited by examiner

*Primary Examiner* — Shaqueal D Wade-Wright
(74) *Attorney, Agent, or Firm* — Michael Dryja

(57) ABSTRACT

A public key service determines a seed value used by a sending device to generate a one-time signature (OTS) private key that the sending device uses to digitally sign a message before sending the message to a receiving device. The public key service generates, based on the seed value, a public key used to authenticate the digitally signed message as having been sent by the sending device. The public key service receives a request for the public key from the receiving device, and in response sends the public key to the receiving device, such that the receiving device is able to authenticate the message.

20 Claims, 9 Drawing Sheets

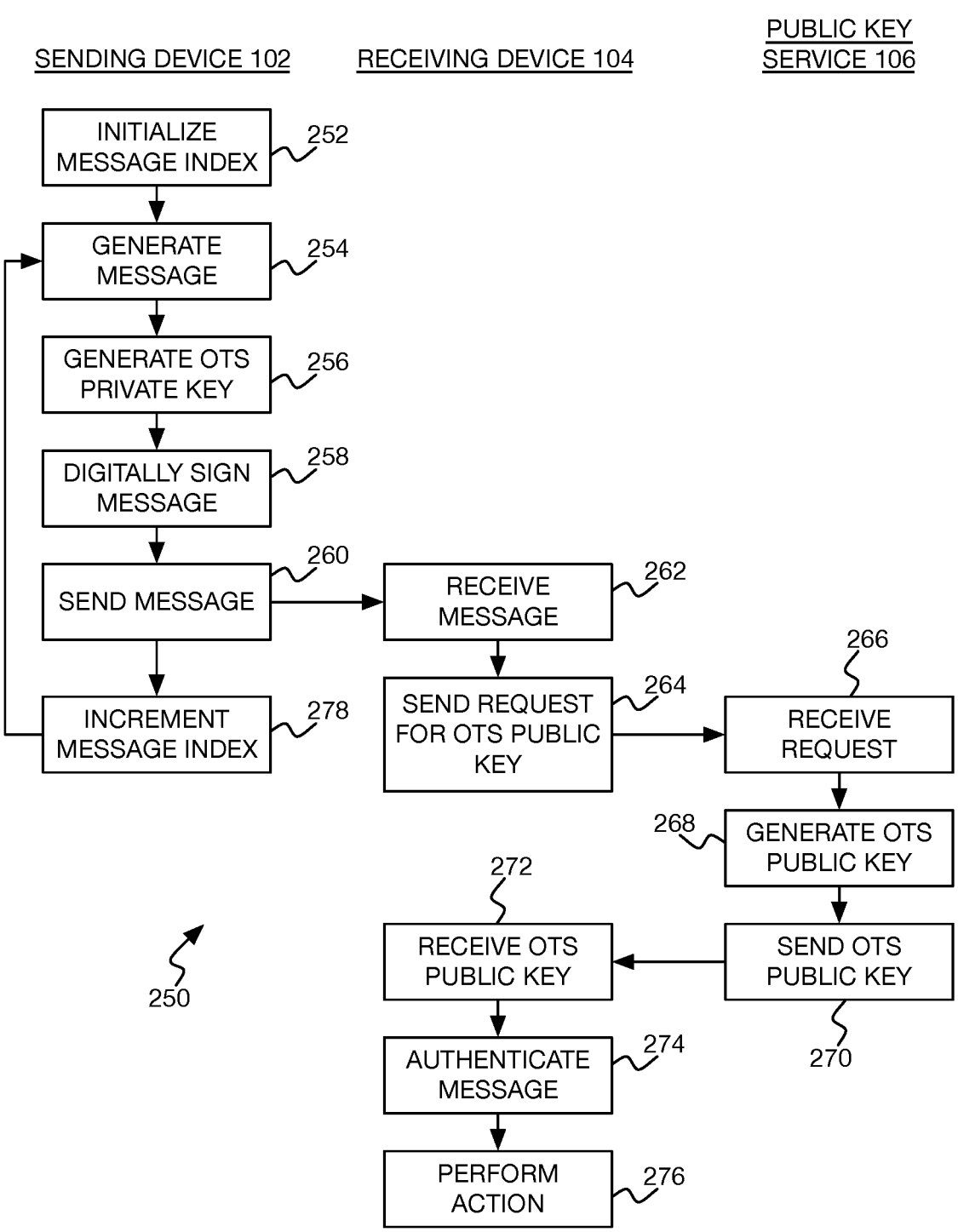

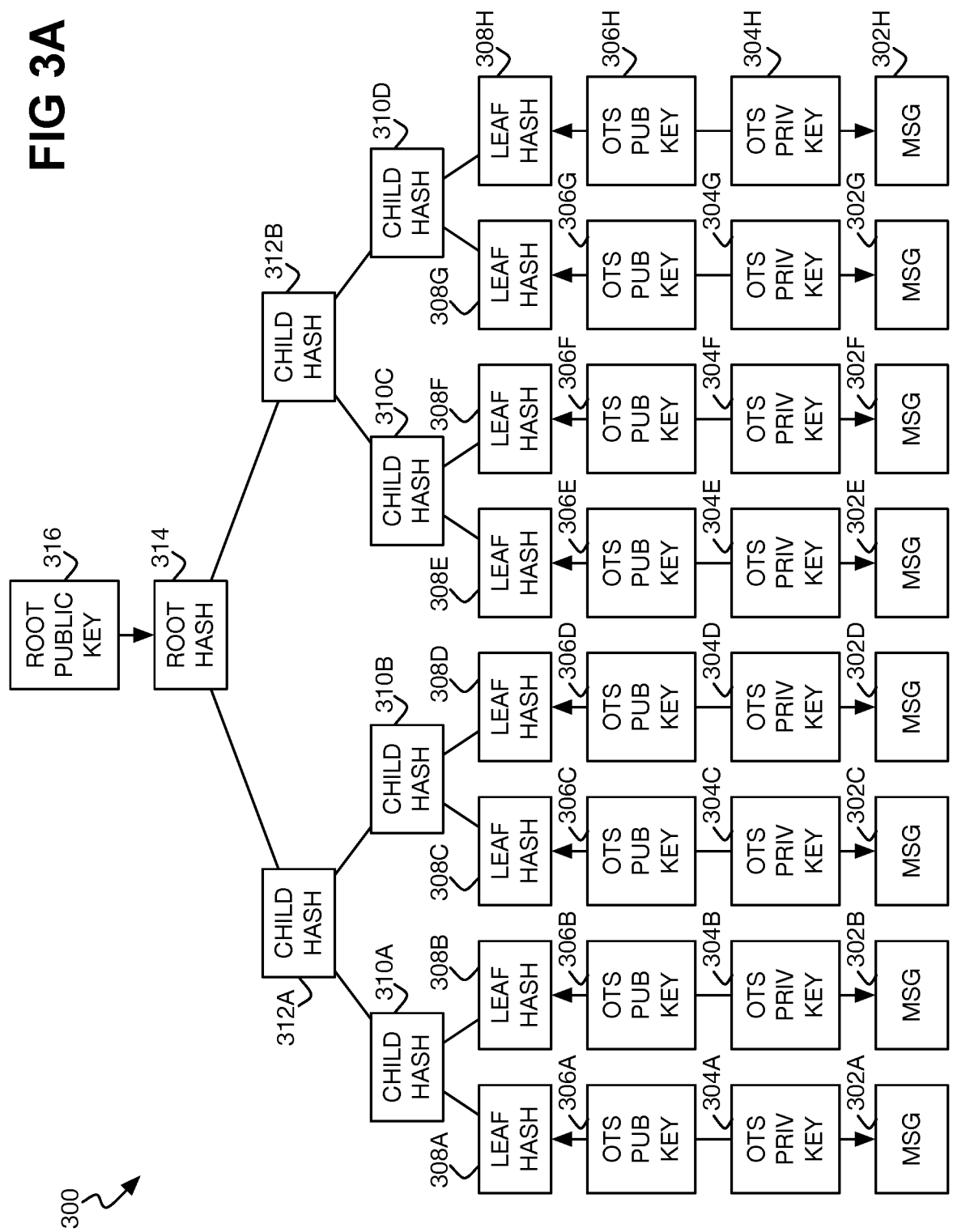

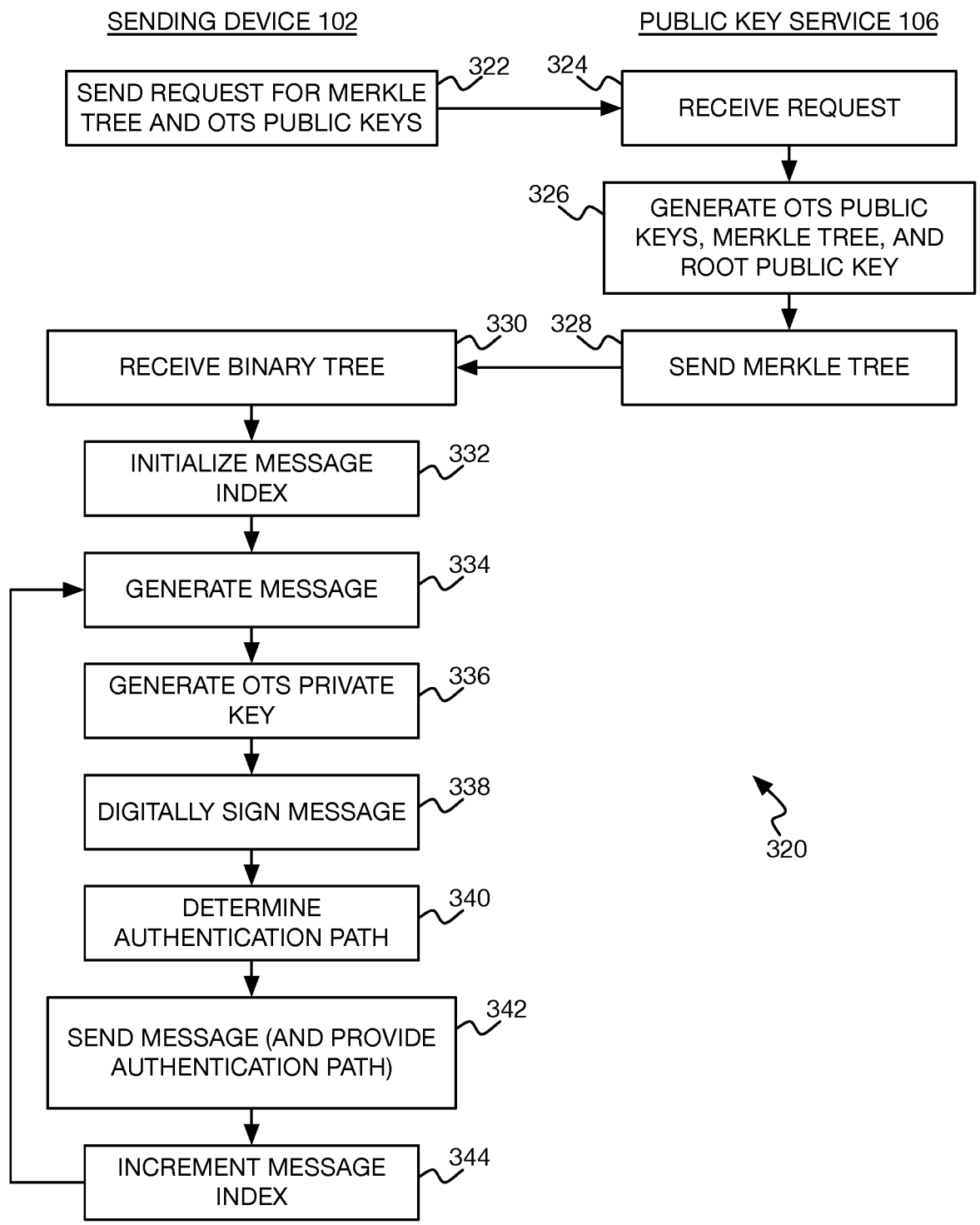

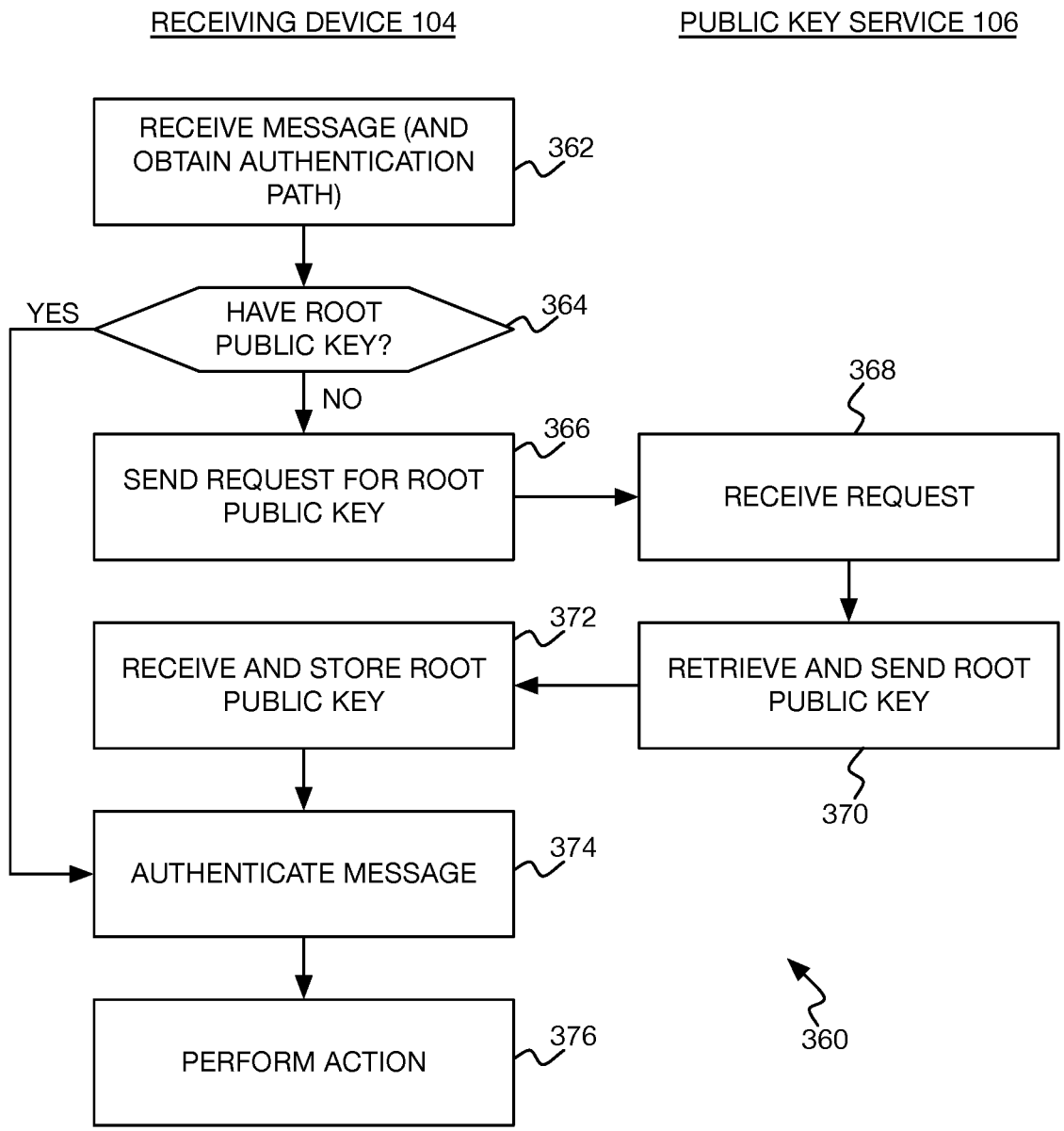

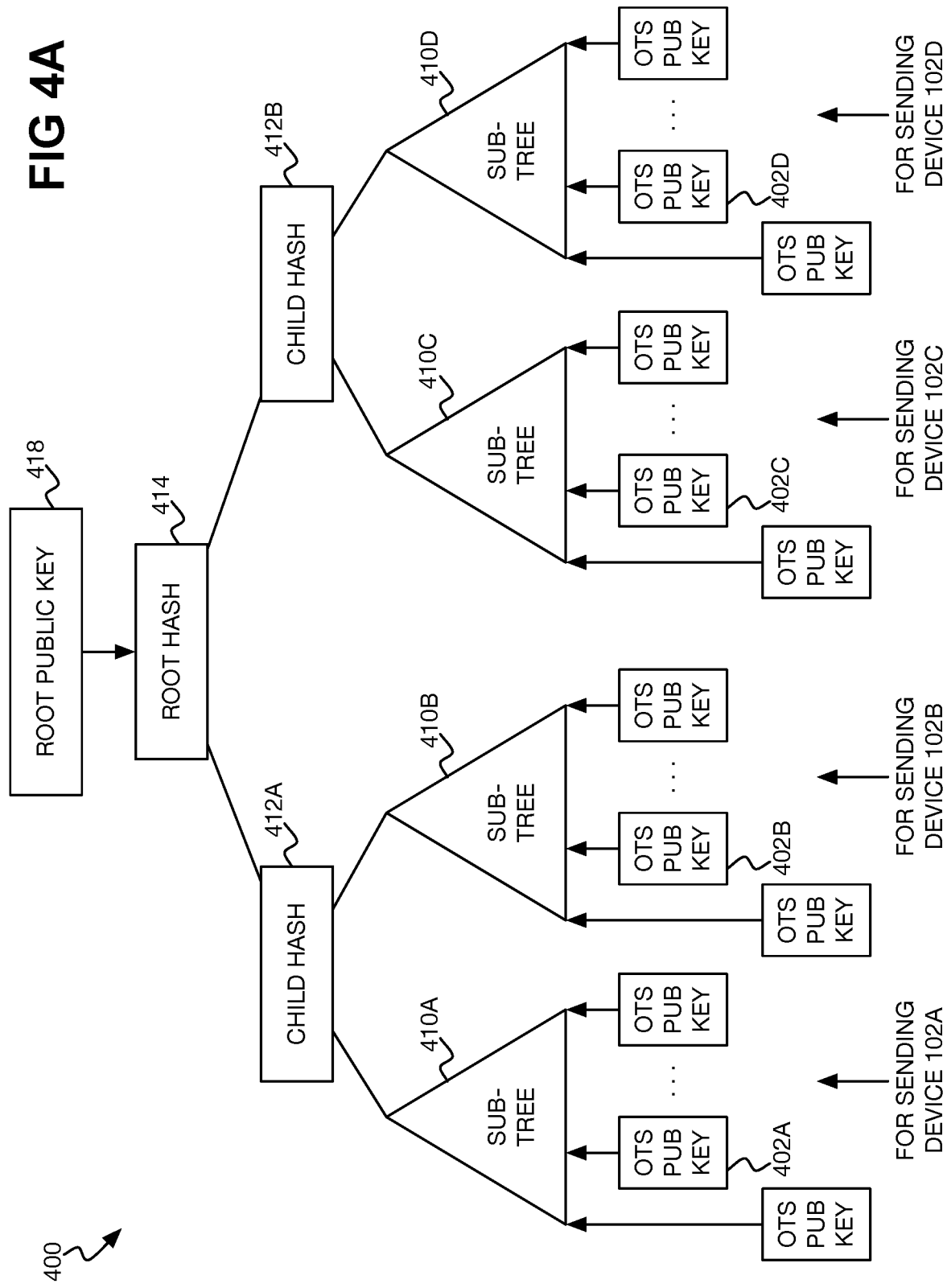

PUBLIC KEY SERVICE FOR MESSAGE AUTHENTICATION

BACKGROUND

Computing and other types of electronic devices are often communicatively connected to networks so that they can send messages to each other. Asymmetric cryptography can be used for message authentication. Specifically, a sending device has a cryptographic key pair made up of a private key and a corresponding public key. The sending device digitally signs a message with the private key before sending it to a receiving device. The receiving device uses the corresponding public key to authenticate that the message was signed by the private key and, assuming that the receiving device trusts that the public key is associated with the sending device, thus that the message was sent by the sending device.

BRIEF DESCRIPTION OF THE DRAWINGS

FIG. 2B is a flowchart of an example method for the implementation of FIG. 2A as to the sending device, the receiving device, and the public key service.

FIG. 3A is a diagram of an example implementation in which the root public key of a Merkle or other binary tree is also used to authenticate that messages were sent by a sending device.

FIG. 3B is a flowchart of an example method for the implementation of FIG. 3A as to the sending device and the public key service.

FIG. 3C is a flowchart of an example method for the implementation of FIG. 3A as to the receiving device and the public key service.

FIGS. 4A and 4B are diagrams of example implementations in which the root public key of the same Merkle or other binary tree is used for more than one sending device.

DETAILED DESCRIPTION OF THE DRAWINGS

Figure 1:
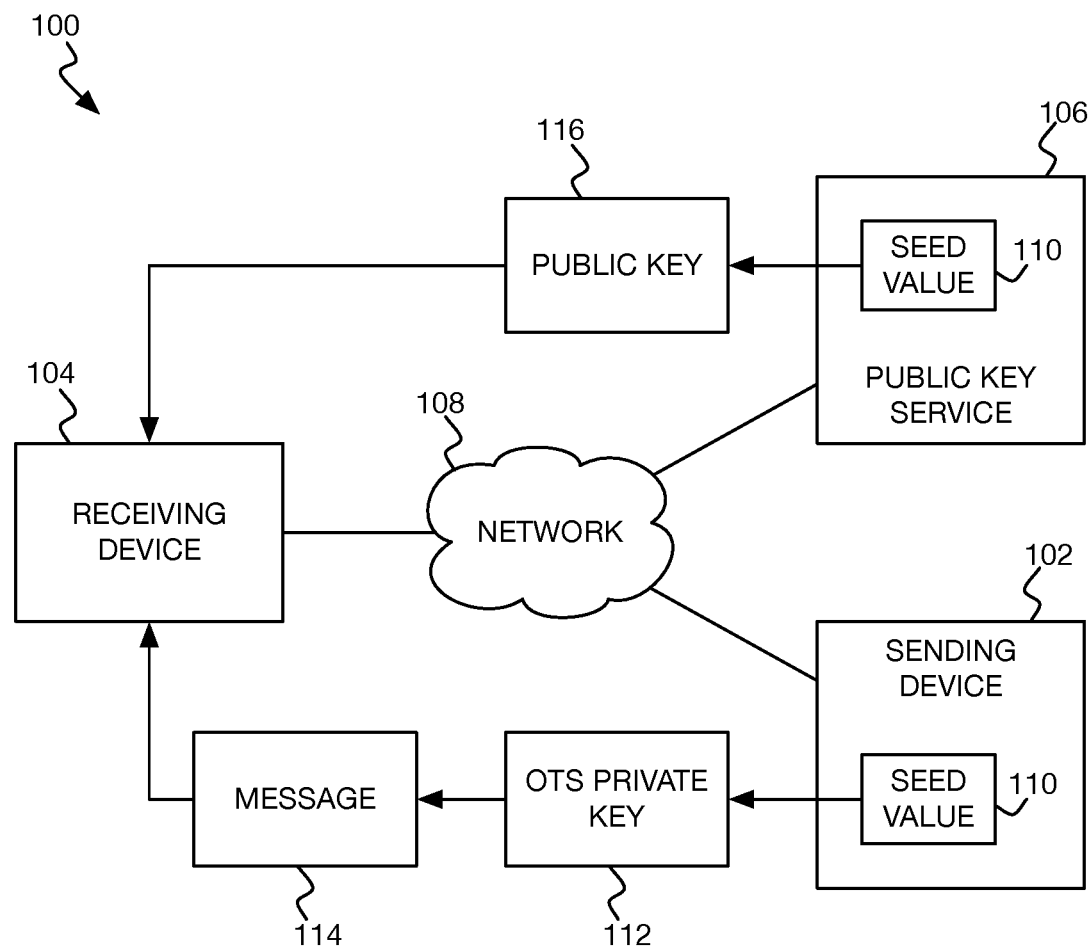
FIG. 1 is a diagram of an example system including a public key service for authentication of messages sent from a sending device to a receiving device.

As noted in the background, asymmetric cryptography can be used for message authentication. Upon receiving a message from a sending device that has been digitally signed with a private key, a receiving device can use the corresponding public key to authenticate that the message was sent by the sending device if the receiving device trusts that the public key is associated with the sending device. Traditionally a sending device has used the same private key to digitally sign multiple messages sent to the same or different receiving devices, with the receiving devices then using the same corresponding public key to authenticate the messages. This means that each receiving device may have to receive the public key just once, and moreover may have to authenticate the public key just once in order to trust that the public key is associated with the sending device.

However, with the advent of quantum computing, existing asymmetric cryptography is susceptible to compromise. The usage of quantum computing can permit a nefarious party to determine the private key that a sending device uses to digitally sign messages, and therefore to subsequently masquerade as the sending device. Quantum computing attack-resistant asymmetric cryptography schemes have been developed. For instance, hash-based signature schemes, such as the Leighton-Micali one-time signature (LM-OTS), the Winternitz one-time signature (WOTS), and the WOTS+ schemes are resistant to quantum computing attacks and can be used for digital signature and authentication purposes.

A hallmark of such hash-based quantum computing attack-resistant cryptography schemes is the usage of OTSs. In such schemes, the private key of a given cryptographic key pair can be used just once, to digitally sign a single message. Therefore, the corresponding public key of the key pair is also used just once, to authenticate a single digitally signed message. So long as the private key is not used to digitally sign more than one message, quantum computing may not be able to be used to determine the private key. The private key is thus an OTS private key—and its corresponding public key is likewise an OTS public key—in order to maintain resistance to computing attacks, including quantum computing attacks.

A difficulty with using OTS public keys to authenticate messages is that the receiving device has to trust each public key is associated with the sending device in order to authenticate that the corresponding message was indeed sent by the sending device. It is impracticable for the receiving device to individually authenticate each public key, however. The Leighton-Micali signature (LMS) scheme, which uses LM-OTSs, and the extended Merkle signature scheme (XMSS), which uses WOTS+, provide ways to avoid a receiving device having to individually authenticate each OTS public key in order to trust that the public key is associated with a sending device.

For instance, $2^h$ OTS private keys may be generated using a seed value and a state, such as a counter that is incremented from 0 to $2^h-1$. Corresponding OTS public keys are generated, and combined in a binary tree known as a Merkle tree, which has height h. The OTS public keys correspond to the leaf nodes of the tree, and a root public key corresponds to the root node.

To authenticate that a message has been sent by the sending device, the receiving device does not have to receive the corresponding OTS public key, and thus does not have to authenticate that the OTS public key is itself associated with the sending device. Rather, the receiving device just has to authenticate that the root public key is associated with the sending device.

Specifically, the receiving device authenticates the message using the root public key, the digital signature of the message, and the authentication path from the leaf node corresponding to the OTS public key to the root node in the Merkle tree (where the receiving device has already authenticated the root public key as being associated with the sending device). The authentication path can be included in the message itself.

That is, the receiving device itself calculates a candidate OTS public key from the message and the digital signature of the message, the latter which the sending device generated when digitally signing the message with the OTS private key. The receiving device then verifies that the candidate OTS public key it calculated is part of the binary tree including the root public key, using the authentication path.

Such approaches permit authentication of up to $2^h$ messages using the same trusted root public key. The value for $2^h$ has to be decided before the root public key is generated, however, and cannot be subsequently changed. If the selected value for $2^h$ is too small, a sending device may run out of OTS private keys. The OTS private keys and their corresponding OTS public keys have to be generated before the root public key can be generated, and thus before the first message is sent. Generation of the Merkle tree is therefore computationally expensive, and can be computationally prohibitive for lightweight devices such as Internet of Things (IoT) devices.

Selecting a large value for $2^h$ to ensure that a sending device does not run out of OTS private keys is not a panacea, however. Merkle trees for large values of $2^h$ can require a large amount of storage space, which lightweight devices in particular may not have. For example, schemes such as the LMS-hierarchical signature system (HSS) scheme and the multi-tree XMSS (XMSS^MT) scheme, among others, permit the OTS public keys to not have to be stored after generation, but at the cost of requiring more computation later. Ultimately, quantum computing attack-resistant authentication has proven to either be computationally expensive and thus slow, require a relatively large amount of storage space such as volatile as well as non-volatile memory, or both.

Techniques described herein ameliorate these issues. A public key service has knowledge of a seed value that a sending device uses to generate OTS private keys for digitally signing messages sent to a receiving device. The public key service can accordingly generate a public key used to authenticate a digitally signed message sent from the sending device to the receiving device, and provide the public key to the receiving device. The public key service is trusted by the receiving device, which means that the receiving device trusts that the public key received from the public key service is associated with the sending device.

Therefore, upon receiving a digitally signed message that is purportedly from the sending device, the receiving device can use the public key received from the public key service to authenticate that the message was indeed sent by the sending device. In one implementation, the public key may be the OTS public key corresponding to the OTS private key used to digitally sign the message. In this case, the receiving device has to acquire a new public key from the public key service each time a message is received from the sending device.

In another implementation, the public key may be the root public key for a Merkle or other binary tree that includes leaf nodes for the OTS public keys corresponding to the OTS private keys used to digitally sign respective messages. In this case, the receiving device has to acquire the public key from the public key service just once (or for every $2^h$ messages when a given public key is used for $2^h$ messages). This implementation further permits the sending device to use a Merkle or other binary tree where such usage would otherwise be computationally prohibitive or require too much storage space.

For instance, the public key service can generate the Merkle tree for the sending device, since the public key service has knowledge of the seed value that the sending device uses to generate OTS private keys for digitally signing messages. The public key service can then provide the Merkle tree to the sending device. The sending device can thus use a Merkle tree even if it is computationally prohibitive for the sending device to generate the Merkle tree itself. If the sending device does not have sufficient storage space to store the entire Merkle tree, the public key service can provide portions of the Merkle tree to the sending device as needed.

FIG. 1 shows an example system 100 including a sending device 102, a receiving device 104, and a public key service 106 that are communicatively connected to one another via a network 108. The sending device 102 and the receiving device 104 can each be a computing device or another type of electronic device. Examples of computing devices include desktop, laptop, notebook, and server computers, as well as other computing devices, including smartphones, tablet computing devices, and so on.

Other types of electronic devices include networking devices such as routers, firewalls, access points, and so on, as well as printing and/or image devices such as printers, scanners, and all-in-one (AIO) devices that have at least printing functionality and scanning functionality. At least one of the devices 102 and 104 may be a lightweight device such as an IoT device. The public key service 106 can be a cloud service provided by one or multiple servers or other types of computing devices. The network 108 may be or include the Internet and/or other types of networks.

The sending device 102 has a seed value 110 that can be unique to the sending device 102 as compared to other sending devices. The sending device 102 uses the OTS private key 112 to digitally sign a message 114 before sending the message 114 (as has been digitally signed) to the receiving device 104 over the network 108. The sending device 102 generates a different OTS private key 112, using the seed value 110, for each message 114 to be sent to the receiving device 104. For instance, the sending device 102 may maintain a message index that is incremented each time a message 114 is to be sent, and use a quantum computing attack-resistant cryptographic hash function to generate the corresponding OTS private key 112 from the seed value 110 and the index.

The public key service 106 has knowledge of the seed value 110 that the sending device 102 uses to generate OTS private keys 112 used for digitally signing messages 114. For instance, at time of manufacture or provisioning of the sending device 102, or a secure microcontroller thereof such as a trusted platform module (TPM), the seed value 110 may be generated by the public key service 106 and provided to the sending device 102 or its microcontroller.

As another example, the public key service 106 may not generate the seed value 110, but be provided the seed value 110 when it is generated and stored in the sending device 102 or a microcontroller thereof. As a third example, the public key service 106 and the sending device 102 may agree on the seed value 110 that the sending device 102 is to use in accordance with a key agreement scheme, such the Diffie-Hellman key exchange technique.

Since the public key service 106 has knowledge of the seed value 110, the public key service 106 is able to generate a public key 116 that is used to authenticate at least one digitally signed message 114 sent by the sending device 102. The receiving device 104 therefore obtains the public key 116 from the public key service 106 over the network, and uses the public key 116 to authenticate that the digitally signed message 114 was indeed sent by the sending device 102. The same public key 116 may be used for multiple messages 114, or a different public key 116 may be used for each message 114.

The public key service 106 is trusted by the receiving device 104. Therefore, the receiving device 104 trusts that the public key 116 is associated with the sending device 102. As such, when the receiving device 104 successfully authenticates a digitally signed message 114 that is purportedly from the sending device 102, this means that the receiving device 104 authenticates that the message 114 was indeed sent by the sending device 102. The public key service 106 thus provides a way by which the receiving device 104 can receive a trusted public key 116 known to be associated with the sending device 102.

Figure 2A:
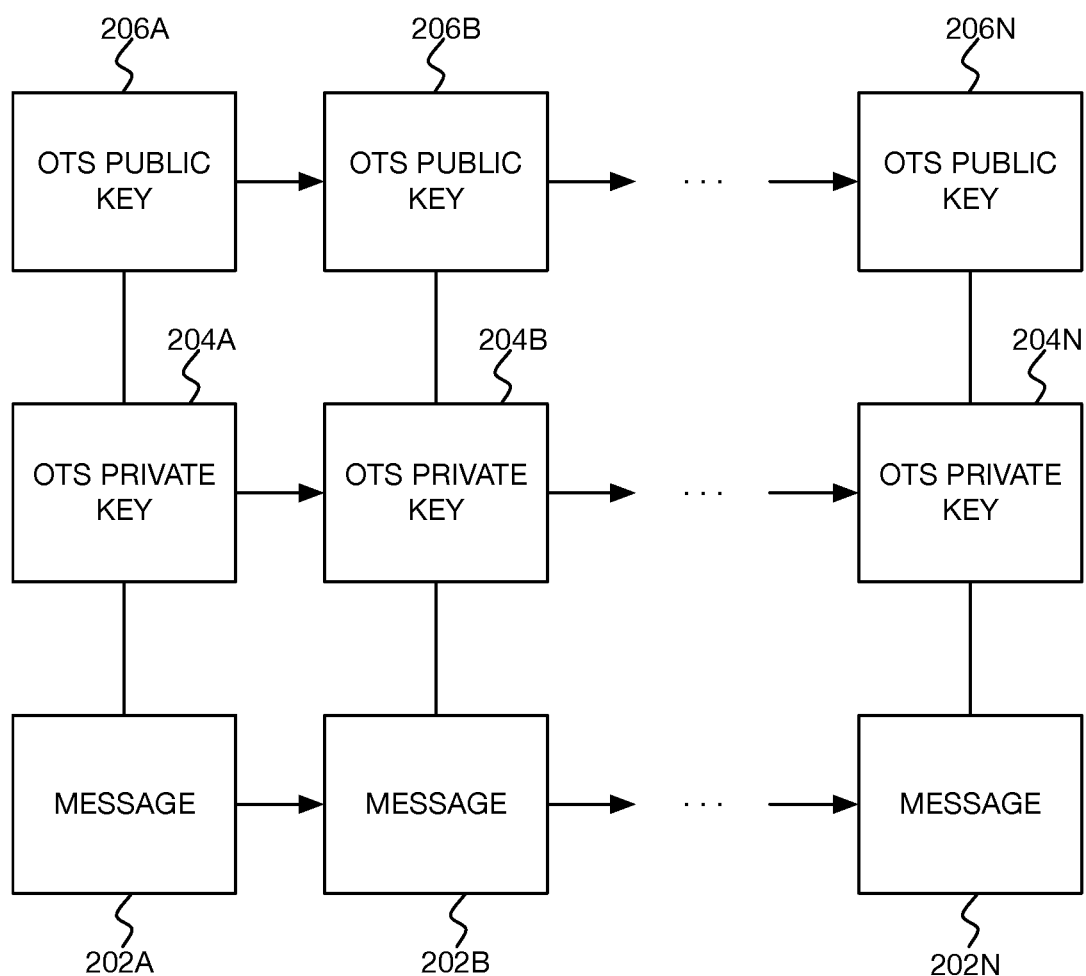
FIG. 2A is a diagram of an example implementation for using just one-time signature (OTS) public keys to authenticate that messages were sent by the sending device.

FIGS. 2A and 2B show an example implementation in which the public key that the receiving device 104 obtains from the public key service 106 is used to authenticate a single digitally signed message as having been sent by the sending device 102. The public key in this implementation is the OTS public key corresponding to the OTS private key that the sending device 102 used to digitally sign the message. The OTS public key and the OTS private key constitute an asymmetric cryptographic key pair. Just this public key may be needed to authenticate the message as having been sent by the sending device 102.

Per FIG. 2A, messages 202A, 202B, . . . , 202N, collectively referred to as the messages 202, are digitally signed with respective OTS private keys 204A, 204B, . . . , 204N, which are collectively referred to as the OTS private keys 204. The OTS private keys 204A, 204B, . . . , 204N themselves have corresponding OTS public keys 206A, 206B, . . . , 206N that are collectively referred to as the OTS public keys 206.

Per the method 250 of FIG. 2B, prior to sending the first message 202A to the receiving device 104, the sending device 102 can initialize or reset a message index to an initial value (252), such as zero. The sending device 102 generates the message 202A (254), which can include the current value of the message index. The message 202A may also include an identifier that uniquely identifies the sending device 102 as compared to other sending devices, such as by its media access control (MAC) address, for instance.

The sending device 102 generates the OTS private key 204A for the message 202A based on its seed value 110 (256), and digitally signs the message 202A using the OTS private key 204A (258). The sending device 102 may generate an asymmetric cryptographic key pair including both the OTS public key 206A and the OTS private key 204A, or may generate just the OTS private key 204A. As has been noted, the sending device 102 may use a quantum computing attack-resistant cryptographic hash function, such as that provided by the LM-OTS scheme, to generate the OTS private key 204A from its seed value 110 and the current value of the message index.

The sending device 102 sends the digitally signed message 202A to the receiving device 104 (260). That the sending device 102 digitally signs the message 202A means that the sending device 102 generates a digital signature of the message 202A. Therefore, that the sending device 102 sends the digitally signed message 202A means that the sending device 102 sends the message 202A and the digital signature of the message 202A.

The receiving device 104 accordingly receives the digitally signed message 202A (262) (i.e., the message 202A and its digital signature). The receiving device 104 sends a request to the public key service 106 for the OTS public key 206A for the message 202A (264). The request may include the value of the message index included the message 202A, as well as the identifier of the sending device 102. (It is noted that in one implementation, the receiving device 104 may send a request for the OTS public key for each of one or multiple messages even before the messages are received. In this case, the receiving device 104 stores one or more OTS public keys in advance, for future verification purposes.) The public key service 106 receives the request (266), and generates the OTS public key 206A for the message 202A based on the seed value 110 of the sending device 102 (268).

For example, the public key service 106 may derive or look up the seed value 110 for the sending device 102 based on the identifier of the sending device 102 provided in the request. The public key service 106 can then generate the OTS public key 206A from the seed value 110 and the value of the message index included in the message 202A. The public key service 106 uses the same quantum computing attack-resistant cryptographic hash function to generate the OTS public key 206A that the sending device 102 used to generate the OTS private key 204A. The public key service 106 may generate an asymmetric cryptographic key pair including both the OTS public key 206A and the OTS private key 204A.

The public key service 106 sends the OTS public key 206A to the receiving device 104 (270), which accordingly receives the OTS public key 206A (272). The receiving device 104 can authenticate that the message 202A was indeed sent by the sending device 102 using the OTS public key 206A (and the digital signature of the message 202A) (274). This is because the receiving device 104 received the OTS public key 206A from the public key service 106. Since the receiving device 104 trusts the public key service 106, the receiving device 104 trusts that the OTS public key 206A is associated with sending device 102.

The receiving device 104 can perform an action based on received message 202A (276). Because the receiving device has authenticated that the message 202A has indeed been sent by the sending device 102, the receiving device 104 may thus act on the message 202A. For example, if the payload of the message 202A includes an action that the receiving device 104 is to perform, the receiving device 104 performs the action. If the payload of the message 202A includes information regarding the sending device 102 or other information, the receiving device 104 can consider this information authentic and store and/or otherwise act on the information.

Upon sending the message 202A, the sending device 102 increments the message index to the next value (278), and the method 250 is repeated at 254 when the next message 202B is sent. (It is noted that the message index may be incremented before sending a message, as opposed to after sending the message.) The sending device 102 does not have to generate a given OTS private key 204A, 204B, . . . , 204N until the corresponding message 202A, 202B, . . . , 202N is to be sent. The sending device 102 also does not have to store the OTS private key 204A, 204B, . . . , 204N once the corresponding message 202A, 202B, . . . , 202N has been signed.

The public key service 106 may not have to generate a given OTS public key 206A, 206B, . . . , 206N until it receives a corresponding request from the receiving device 104. However, because each OTS public key 206A, 206B, . . . , 206N can be used to authenticate only a single corresponding message 202A, 202B, . . . , 202N as having been sent by the sending device 102, the receiving device 104 has to receive an OTS public key from the public key service 106 for each message received from the sending device 102.

FIGS. 3A, 3B, and 3C show an example implementation in which the public key that the receiving device 104 obtains from the public key service 106 can be used to authenticate multiple messages as having been sent by the sending device 102. The public key in this implementation is a root public key for the Merkle or other binary tree including leaf hashes for the OTS public keys corresponding to the OTS private keys that the sending device 102 uses to digitally sign the messages. For each message, the root public key and the authentication path from the leaf hash for the OTS public key to the root hash for the root public key may be needed to authenticate the message (as well as the signature of the message).

Per FIG. 3A, messages 302A, 302B, 302C, 302D, 302E, 302F, 302G, and 302H, collectively referred to as the messages 302, are digitally signed with respective OTS private keys 304A, 304B, 304C, 304D, 304E, 304F, 304G, and 304H, which are collectively referred to as the OTS private keys 304. The OTS private keys 304A, 304B, 304C, 304D, 304E, 304F, 304G, and 304H themselves have corresponding OTS public keys 306A, 306B, 306C, 306D, 306E, 306F, 306G, and 306H that are collectively referred to as the OTS public keys 306.

The Merkle tree 300 includes leaf hashes 308A, 308B, 308C, 308D, 308E, 308F, 308G, and 308H corresponding to the OTS public keys 306A, 306B, 306C, 306D, 306E, 306F, 306G, and 306H, and which are collectively referred to as the leaf hashes 308. The Merkle tree 300 includes child hashes 310A, 310B, 310C, and 310D, collectively referred to as the child hashes 310, as well as child hashes 312A and 312B, which are collectively referred to as the child hashes 312. The Merkle tree includes a root hash 314 corresponding to the root public key 316.

The leaf hashes 308 are also technically child hashes, but because they do not themselves have child hashes are not labeled as such in the figure. Since the Merkle tree 300 is a binary tree, every hash other than the leaf hashes 308 has two child hashes. In the example, the Merkle tree 300 has a height h=3, which means that the tree 300 has three levels of hashes below the root hash 314: the level of the child hashes 312, the level of the child hashes 310, and the level of leaf hashes 308.

The Merkle tree 300 is created, such as per the LMS or XMSS scheme, as follows. For a specified height h, $2^h$ OTS private keys 304 and $2^h$ corresponding OTS public keys 306 are generated. The leaf hashes 308 correspond to their respective public keys 306 in that they are hashes of at least the public keys 306 (e.g., a leaf hash 308 is generated by providing its respective public key 306 and potentially other inputs into a hash function) or in that they are the public keys 306.

Each child hash 310 and 312 is in general a hash of at least two child hashes. In the example, each child hash 310 is specifically a hash of at least its two leaf hashes 308, and each child hash 312 is a hash of at least its two child hashes 310. The root hash 314 of the Merkle tree 300 is similarly a hash of at least its two child hashes 312. The root hash 314 corresponds to the root public key 316. That is, the root public key 316 is the root hash 314 (i.e., the root public key 316 is the hash of at least the child hashes 312).

To authenticate a message 302 as having been sent by the sending device 102, the receiving device 104 calculates a candidate OTS public key from the message 302 and the digital signature of the message 302. The receiving device 104 then verifies that the hash of the candidate OTS public key it calculated is part of the Merkle tree 300 including the root public key 316 provided by the public key service 106.

The receiving device 104 performs this verification using an authentication path through the tree 300 from the corresponding leaf hash 308 to the root hash 314, where this authentication path is provided by the sending device 102. The authentication path to authenticate a message 302, for instance, includes one leaf hash 308 and h−1 child hashes 310 and 312 (where there are $2^h$ leaf hashes 308), which are sufficient to calculate the root hash 314 from the calculated candidate OTS public key 306 for the message 302.

For example, to authenticate the message 302C digitally signed with the OTS private key 304C, the root public key 316 and the authentication path from the leaf hash 308C to the root hash 314 in the tree 300 are used. The authentication path for the message 302C includes the leaf hash 308D, the child hash 310A, and the child hash 312B. The leaf hash 308C is calculated from the candidate OTS public key 306C that is itself calculated from the message 302C and the signature of the message 302C. The child hash 310B is calculated from the calculated leaf hash 308C and the provided leaf hash 308D. The child hash 312A is calculated from the provided child hash 310A and the calculated child hash 310B. The root hash 314 is calculated from the calculated child hash 312A and the provided child hash 312B, and whether it matches the provided root public key 316 is determined.

Per the method 320 of FIG. 3B, prior to sending any message 302 to the receiving device 104, the sending device 102 sends a request to the public key service 106 for the Merkle tree 300 (322). The public key service 106 receives the request (324), and in response generates the OTS public keys 306, the Merkle tree 300, and the root public key 316 (326). The OTS public keys 306 can be generated as described above in relation to FIG. 2B, using the seed value 110 of the sending device 102 and sequentially incremented values of a message index.

The public key service 106 sends the Merkle tree 300 to the sending device 102 (328), which receives and stores the tree 300 (330). The public key service 106 does not have to send the root public key 316 (nor the OTS public keys 306) to the sending device 102, however. Prior to sending the first message 302A to the receiving device 104, the sending device 102 initializes or resets the message index (332). The sending device 102 generates the message 302A (334), which can include the current value of the message index and an identifier that uniquely identifies the sending device 102.

The sending device 102 generates the OTS private key 304A for the message 302A based on its seed value 110 as has been described (336), and digitally signs the message 302A with the OTS private key 304A (338). The sending device 102 also determines the authentication path through the Merkle tree 300 from the leaf hash 308A for the OTS public key 306A to the root hash 314 (340). The authentication path for the message 302A is the leaf hash 308B, the child hash 310B, and the child hash 312B.

The sending device 102 sends the digitally signed message 302A (i.e., the message 302A and the digital signature thereof) to the receiving device 104 (342), as well as provides the authentication path for the message 302A to the receiving device 104. The authentication path may be provided in one implementation by being included in the message 302A that is digitally signed with the OTS private key 304A. In this case, the authentication path is generated before the message 302A.

The sending device 102 increments the message index to the next value (344), and the method 320 is repeated when the next message 302B is sent. (As noted above, the message index may be incremented before or after a given message 302 is sent.) The sending device 102 does not have to generate the OTS private key 304 for a given message 302 until the message 302 is to be sent. The sending device 102 does not have to store an OTS private key 304 once the corresponding message 302 has been digitally signed. However, the public key service 106 has to generate the entire Merkle tree 300 before any message 302 is sent.

As noted, a Merkle tree 300 of height h can be used for $2^h$ messages 302. Once $2^h$ messages 302 have been sent, the method 320 is performed again for the next $2^h$ messages 302. For example, where h=3, once $2^h$=8 messages 302 having message indices 0, 1, . . . , 7 have been sent, the method 320 is performed for the next $2^h$=8 messages 302 having message indices 8, 9, . . . , 15. The value of h may be determined to balance the public key service 106 generating unnecessary OTS public keys 306 on the one hand and the sending device 102 sending too frequent requests to the public key service 106 on the other hand.

In the described example, the sending device 102 requests the entire Merkle tree 300 from the public key service 106 before digitally signing and sending any message 302 to the receiving device 104. This assumes that the sending device 102 has sufficient storage space to store the entire Merkle tree 300, therefore. If the sending device 102 does not have sufficient storage space, then it may request just a portion of the Merkle tree 300 for a subset of messages 302 before digitally signing and sending any message 302 to the receiving device 104. Once these messages 302 have been sent to the receiving device 104, the sending device 102 then requests the next portion of the tree 300 for the next subset of messages 302 from the public key service 106.

For example, the sending device 102 may first request the portion of the Merkle tree 300 for messages 302A, 302B, 302C, and 302D. Therefore, the public key service 106 sends at least the child hash 312B. The public key service 106 may also send the leaf hashes 308A, 308B, 308C, and 308D and/or the child hashes 310A and 310B, or the sending device 102 may calculate them itself. The leaf hashes 308E, 308F, 308G, and 308H and the child hashes 310C and 310D are not sent, because they are not needed for the authentication path of any message 302A, 302B, 302C, or 302D.

Once the messages 302A, 302B, 302C, and 302D have been sent, the sending device 102 then requests the portion of the Merkle tree 300 for messages 302E, 302F, 302G, and 302H. The public key service 106 accordingly sends at least the child hash 312A. The public key service 106 may also send the leaf hashes 308E, 308F, 308G, and 308H, and/or the child hashes 310C and 310D, or the sending device 102 may calculate them itself. The leaf hashes 308A, 308B, 308C, and 308D and the child hashes 310A and 310B are not sent, because they are not needed for the authentication path of any message 302E, 302F, 302G, and 302H.

Per the method 360 of FIG. 3C, the receiving device 104 receives a digitally signed message 302 purportedly from the sending device, and obtains the authentication path for that message 302 (362). The authentication path may be included in the digitally signed message 302 itself, or may be provided in a different way. If the receiving device 104 does not already have the root public key 316 for the Merkle tree 300 including the leaf hash 308 corresponding to the OTS public key 306 for the message 302 (364), it sends a request for the root public key 316 to the public key service 106 (366).

The public key service 106 receives the request, which may include the message index value of the received message 302 and the identifier of the sending device 102 that purportedly sent the message 302 (368). The public key service 106 retrieves and sends the root public key 316 to the receiving device 104 (370), which accordingly receives and stores the root public key 316 (372). The public key service 106 will have previously generated and stored the root public key 316 per the method 320 of FIG. 3B.

The receiving device 104 then authenticates the received message 302 as having been sent by the sending device 102 (374), using the received root public key 316, and the provided authentication path for the message 302 through the Merkle tree 300. Upon successful authentication, the receiving device 104 can perform an action based on the received message 302 as has been described (376). The method 360 is performed each time a message 302 is received.

Figure 4B:
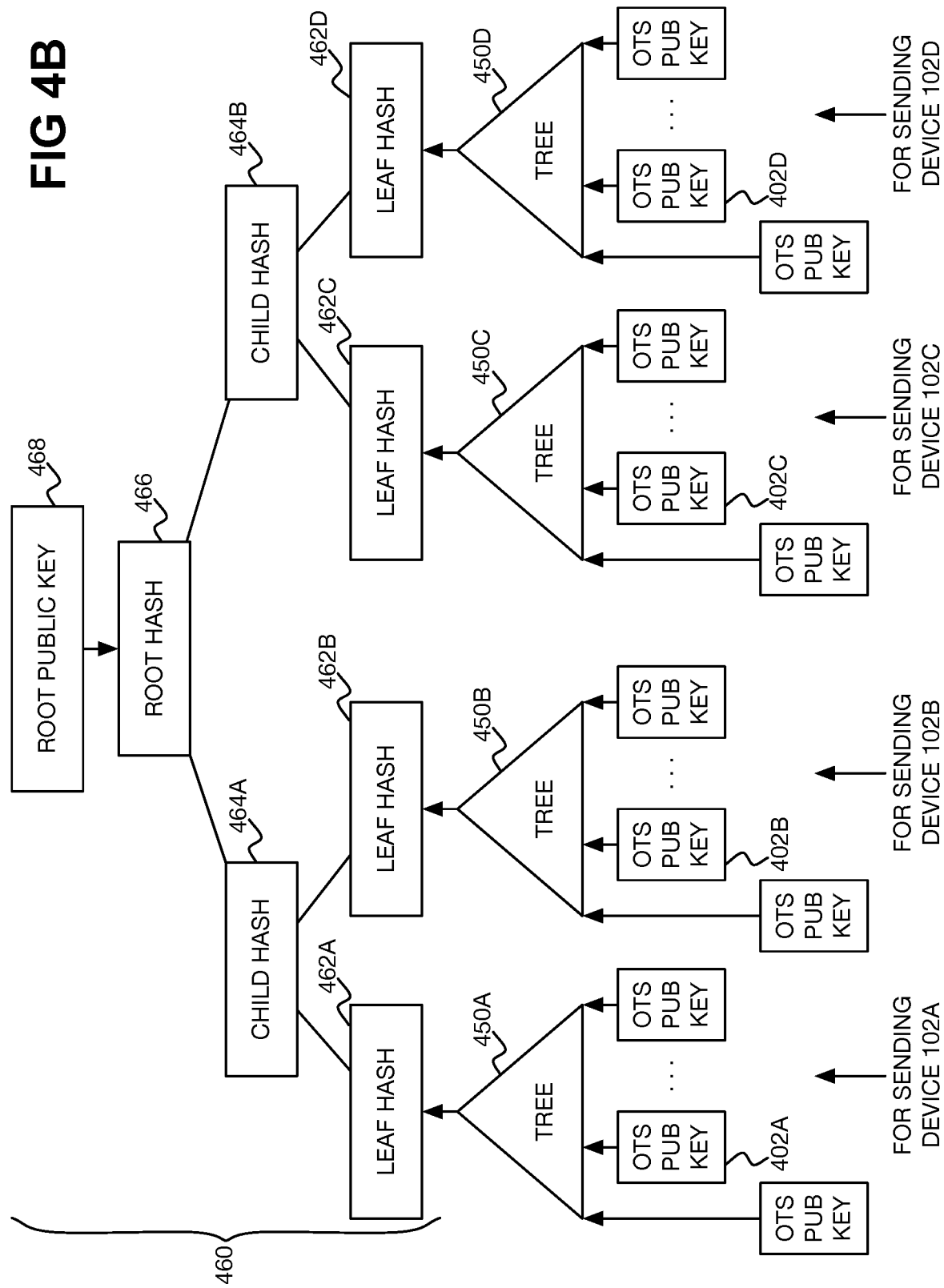

FIGS. 4A and 4B show example implementations in which the public key that the receiving device 104 obtains from the public key service 106 can be used to authenticate messages from more than one sending device 102. Whereas in the implementation of FIGS. 3A, 3B, and 3C a root public key is used only for one sending device 102, in the implementations of FIGS. 4A and 4B the same root public key can be used for multiple sending devices 104 (which still have their own seed values 110).

In the particularly depicted example of FIG. 4A, a Merkle tree 400 includes sub-trees 410A, 410B, 410C, and 410D, collectively referred to as the sub-trees 410, for four sending devices 102A, 102B, 102C, and 102D, which are collectively referred to as the sending devices 102. Each sub-tree 410 can be an instance of the Merkle tree 300 of FIG. 3A. The sub-tree 410A for the sending device 102A is generated from OTS public keys 402A for digitally signing messages sent by the device 102A. The sub-tree 410B is generated from OTS public keys 402B for messages sent by the sending device 102B. The sub-tree 410C is generated from OTS public keys 402C for messages sent by the sending device 102C. The sub-tree 410D is generated from OTS public keys 402D for messages sent by the sending device 102D.

The Merkle tree 400 includes child hashes 412A and 412B, which are collectively referred to as the child hashes 412. The child hash 412A is the hash of the root hashes of the sub-trees 410A and 410B, and the child hash 412B is the hash of the root hashes of the sub-trees 410C and 410D. The Merkle tree 400 includes a root hash 414, which is the hash of the child hashes 412. In the depicted example, there are four sending devices 102, and therefore just one level of child hashes 412 between the root hash 414 and the sub-trees 410. More generally there are j−1 levels of child hashes 412 for $2^j$ sending devices 102.

The root public key 418 corresponds to the root hash 414, and is used to authenticate messages sent by any sending device 102 for which the Merkle tree 400 includes a corresponding sub-tree 410. This means that the receiving device 104 does not have to request a separate root public key from the public key service 106 for each sending device 102. Rather, once it has requested and received the root public key 418, the receiving device 104 can use that same root public key 418 to authenticate messages from all the sending devices 102. That is, for a given message, the same root public key 418—along with the digital signature and the message itself—is used to authenticate the message, regardless of the sending device 102 that sent the message.

In the particularly depicted example of FIG. 4B, there are Merkle trees 450A, 450B, 450C, and 450D, which are collectively referred to as the Merkle trees 450, for respective sending devices 102A, 102B, 102C, 102D, which are collectively referred to as the sending devices 102 as before. Each Merkle tree 450 can be an instance of the Merkle tree 300 of FIG. 3A. The tree 450A is for the sending device 102A and is generated from OTS public keys 402A for digitally signing messages sent by the device 102A. The tree 450B is generated from OTS public keys 402B for messages sent by the sending device 102B. The tree 450C is generated from OTS public keys 402C for messages sent by the sending device 102C. The tree 450D is generated from OTS public keys 402D for messages sent by the sending device 102D.

There is also a Merkle tree 460 for all the sending devices 102. The Merkle tree 460 includes leaf hashes 462A, 462B, 462C, and 462D, which are collectively referred to as the leaf hashes 462, for respective sending devices 102A, 102B, 102C, and 102D. The Merkle tree 460 includes child hashes 464A and 464B, which are collectively referred to as the child hashes 464. The child hash 464A is the hash of the leaf hashes 462A and 462B, and the child hash 464B is the hash of the leaf hashes 462C and 462D.

The Merkle tree 460 includes a root hash 466, which is the hash of the child hashes 464. In the depicted example, there are four sending devices 102, and therefore four leaf hashes 462 and thus just one level of child hashes 462 between the root hash 466 and the leaf hashes 462. More generally there are $j-1$ levels of child hashes 462 for $2^j$ sending devices 102. The root public key 468 corresponds to the root hash 466.

For a given sending device 102, the corresponding leaf hash 462 in the Merkle tree 460 is used to digitally sign the root public key corresponding to the root hash of the Merkle tree 450 for that sending device 102. For example, for the sending device 102B, the OTS private key associated with the leaf hash 462B is used to digitally sign the root public key corresponding to the root hash of the Merkle tree 450B. As another example, for the sending device 102D, the OTS private key associated with the leaf hash 462D is used to digitally sign the root public key corresponding to the root hash of the Merkle tree 450D.

A given sending device 102 digitally signs a given message in that two digital signatures are generated for the message. The first signature is generated by the sending device 102 digitally signing the message using an OTS private key corresponding to an OTS public key 402 in the Merkle tree 450 of that sending device 102. The second signature is generated by digitally signing the root hash of the Merkle tree 450 of the sending device 102 with the OTS private key associated with the corresponding leaf hash 462 in the Merkle tree 460. This second signature may be generated by the public key service 106 and provided to the sending device 102, since the second signature does not change.

To authenticate the message, the receiving device 104 receives the root public key 468 of the Merkle tree 460 from the public key service 106. The receiving device 104 is also provided (by the sending device 102) with the authentication path from the OTS public key 402 for the message to the root hash of the Merkle tree 450 for the sending device 102. The receiving device 104 is further provided with the authentication path from the leaf hash 462 for the sending device 102 to the root hash 466 in the Merkle tree 460. The receiving device 104 may be provided with the authentication path from this leaf hash 462 to this root hash 466 by the public key service 106 or by the sending device 102. In the latter case, the sending device 102 may have received this information from the public key service 106, for instance.

The receiving device 104 calculates a candidate root public key corresponding to the root hash of the Merkle tree 450 in question, from the first signature and the message. The receiving device 104 then calculates a candidate root public key corresponding to the root hash of the Merkle tree 460, from the second signature and the calculated candidate root public key corresponding to the root Merkle tree 450. The receiving device 104 finally verifies the calculated candidate root public key for the Merkle tree 460 against the root public key 468 received from the public key service 106.

Figure 5:
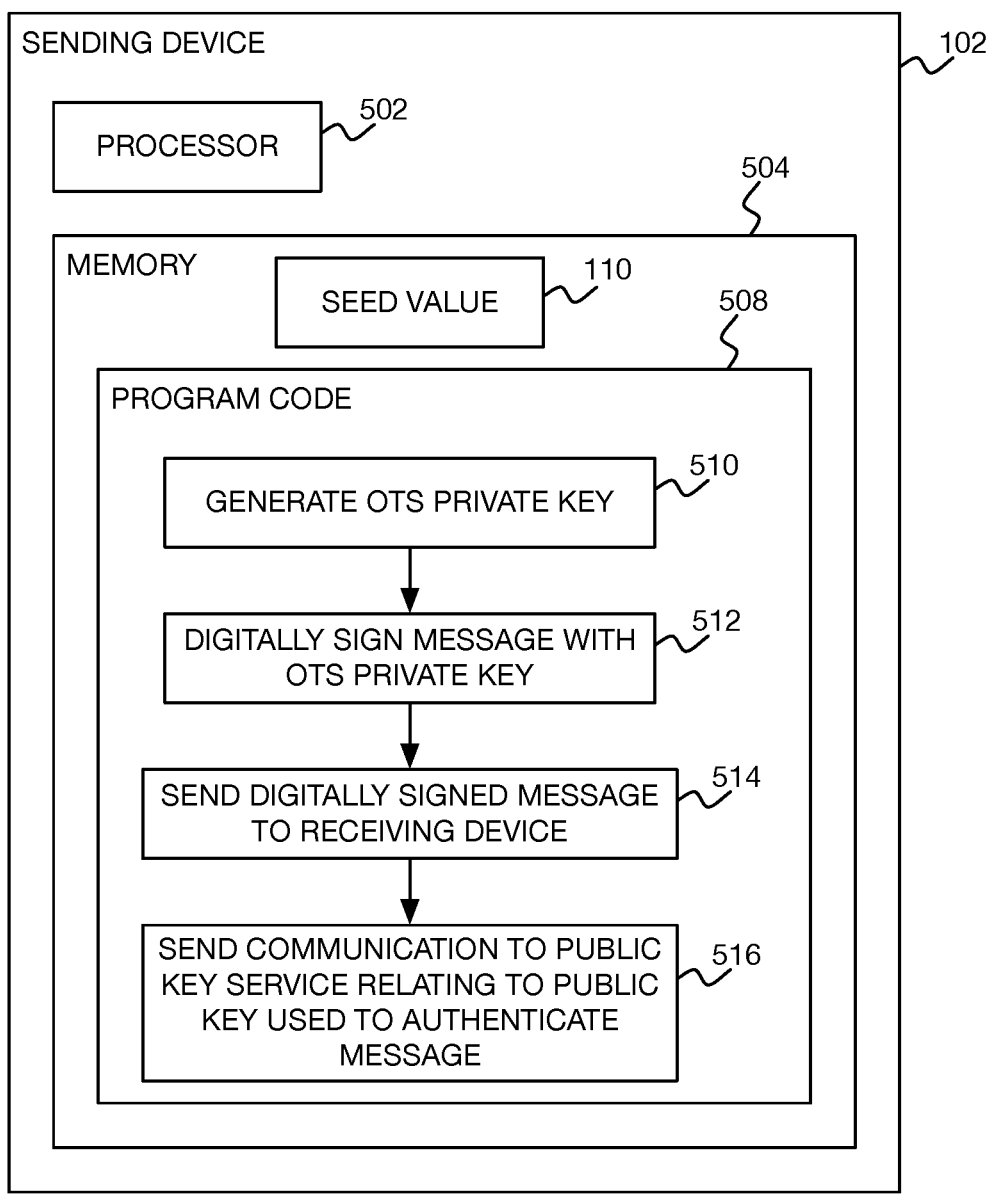
FIG. 5 is a diagram of an example sending device.

FIG. 5 shows an example of the sending device 102. The sending device 102 includes a processor 502 and a memory 504, which is more generally a non-transitory computer-readable data storage medium. The memory 504 can store the seed value 110, as well as program code 508 executable by the processor to perform processing. The processor 502 and the memory 504 may be part of a secure microcontroller of the sending device 102, separate from another processor and other memory used for performing other functionality of the device 102.

The processing includes generating an OTS private key 112 using the seed value 110 (510), digitally signing a message 114 using the generated OTS private key 112 (512), and sending the digitally signed message 114 to the receiving device 104 (514). The processing also includes sending a communication to the public key service 106 (516). The communication is depicted as being sent after 514, but depending on the implementation may instead be sent before 510.

The communication relates to the public key 116 that the public key service 106 generates and provides to the receiving device 104 to use to authenticate the digitally signed message 114 as having been sent by the sending device 102. For example, the communication may be the request sent in 322 of FIG. 3B for (at least a portion of) the binary tree 300 and (at least a subset of) the OTS public keys 306.

As another example, the communication may instead be a communication that the sending device 102 sends in conjunction with the implementation of FIGS. 2A and 2B. In this case, the communication may be the sending device 102 providing the seed value 110 to the public key service 106, or the communication may be the sending device 102 requesting the seed value 110 from the public key service 106. The communication may provide the value to which the message index is initialized in 252 of FIG. 2B so that the public key service 106 is aware that the sending device 102 will be sending (or has sent) messages beginning with that value, or the communication may otherwise indicate that the sending device 102 will be sending messages.

Techniques have been described herein for a public key service that generates and provides a public key to a receiving device to authenticate a digitally signed message received from a sending device. Because the public key service is trusted by the receiving device, the receiving device trusts that the public key is associated with the sending device, and therefore can authenticate the message as having in fact been sent by the sending device. The techniques further can permit sending devices to use schemes that are resistant to quantum computing attacks— including the LMS, XMSS, HSS, and XMSS^MT schemes—that otherwise would be computationally prohibitive and/or require more storage space than is available.

We claim:
1. A method comprising:
   determining, by a processor providing a public key service, a seed value used by a sending device to generate a one-time signature (OTS) private key that the sending device uses to digitally sign a message before sending the message as has been digitally signed to a receiving device;
   generating, by the processor and based on the seed value, a public key used to authenticate the digitally signed message as having been sent by the sending device;

receiving, by the processor, a request for the public key from the receiving device; and in response to receiving the request, sending, by the processor, the public key to the receiving device, such that the receiving device is able to authenticate the message.

2. The method of claim 1, wherein the seed value is unique to the sending device as compared to other sending devices, wherein the public key is an OTS public key corresponding to the OTS private key that the sending device uses to digitally sign the message, and wherein no public key other than the OTS public key is needed to authenticate the message as having been sent by the sending device.

3. The method of claim 2, wherein the OTS public key is generated to correspond to the OTS private key, and wherein a different OTS private key and a different OTS public key are generated for every message that the sending device is to send.

4. The method of claim 1, wherein the sending device is one of a plurality of sending devices, the seed value is unique to the sending device as compared to other of the sending devices, the message is one of a plurality of messages that the sending device is able to send, and the OTS private key is one of a plurality of OTS private keys, wherein the public key is a root public key corresponding to a root hash of a binary tree including a plurality of leaf hashes, the leaf hashes corresponding to OTS public keys for the OTS private keys that the sending device uses to digitally sign the messages, and wherein, for each message, the root public key, and an authentication path from the leaf hash corresponding to the OTS public key to the root hash in the binary tree are needed to authenticate the message as having been sent by the sending device.

5. The method of claim 4, wherein the root public key is used only to authenticate the messages sent by the sending device and not to authenticate messages sent by the other of the sending devices.

6. The method of claim 4, wherein the binary tree comprises a plurality of binary trees respectively corresponding to the sending devices, and wherein the root public key is used to authenticate the messages sent by the sending device as well as to authenticate messages sent by the other of the sending devices.

7. The method of claim 4, further comprising:

generating, by the processor, the OTS public keys corresponding to the OTS private keys; and generating, by the processor, the binary tree based on the OTS public keys, wherein the root public key is generated from the root hash of the binary tree.

8. The method of claim 7, further comprising:

receiving, by the processor, a request from the sending device for the binary tree; and in response to receiving the request, sending, by the processor, the binary tree to the sending device.

9. The method of claim 7, further comprising:

receiving, by the processor, a request from the sending device for a portion of the binary tree corresponding to a subset of the messages; and in response to receiving the request, sending, by the processor, the portion of the binary tree corresponding to the subset of the messages to the sending device.

10. A sending device comprising:

a processor; and a memory storing program code and a seed value, the program code executable by the processor to:

generate a one-time signature (OTS) private key using the seed value;

digitally sign a message using the OTS private key;

send the digitally signed message to a receiving device; and send a communication to a public key service, the communication relating to a public key that the public key service generates and provides to the receiving device to use to authenticate the digitally signed message as having been sent by the sending device.

11. The sending device of claim 10, wherein the seed value is unique to the sending device as compared to other sending devices, wherein the public key is an OTS public key corresponding to the OTS private key that the sending device uses to digitally sign the message, and wherein no public key other than the OTS public key is needed to authenticate the message as having been sent by the sending device.

12. The sending device of claim 11, wherein the message is one of a plurality of messages that the sending device is to send, and the OTS private key is further generated using a message index, and the message index is incremented for each message, such that a different OTS private key is generated for each message.

13. The sending device of claim 10, wherein the sending device is one of a plurality of sending devices, the seed value is unique to the sending device as compared to other of the sending devices, the message is one of a plurality of messages that the sending device is able to send, and the OTS private key is one of a plurality of OTS private keys, wherein the public key is a root public key corresponding to a root hash of a binary tree including a plurality of leaf hashes, the leaf hashes corresponding to OTS public keys for the OTS private keys that the sending device uses to digitally sign the messages, and wherein, for each message, the root public key and an authentication path from the leaf hash corresponding to the OTS public key for the message to the root hash in the binary tree are needed to authenticate the message as having been sent by the sending device.

14. The sending device of claim 13, wherein the program code is executable by the processor to further, as each message is sent, provide to the receiving device the authentication path from the leaf hash corresponding to the OTS public key for the message to the root hash.

15. The sending device of claim 13, wherein the communication is sent to the public key service prior to sending any message to the receiving device, and the communication is a request for the binary tree, and wherein the program code is executable by the processor to further, after sending the communication, receive the binary tree from the public key service.

16. The sending device of claim 13, wherein, for each of a plurality of subsets of the messages, the communication is sent to the public key service prior to sending any message of the subset to the receiving device, and the communication is a request for a portion of the binary tree corresponding to a subset of the messages, and wherein the program code is executable by the processor to further, after sending the communication, receive the portion of the binary tree that has been requested.

17. A non-transitory computer-readable data storage medium storing program code executable by a receiving device to perform processing comprising:
   receiving from a sending device a message that has been digitally signed with a one-time signature (OTS) private key;
   receiving from a public key service a public key to authenticate the digitally signed message as having been sent by the sending device; and
   authenticating the message using the public key.

18. The non-transitory computer-readable data storage medium of claim 17, wherein the public key is an OTS public key corresponding to the OTS private key that the sending device used to digitally sign the message,
   wherein no public key other than the OTS public key is needed to authenticate the message as having been sent by the sending device,
   wherein the message is one of a plurality of messages that the receiving device receives from the sending device, and each message is authenticated with a different OTS public key,
   and wherein the receiving device receives the different OTS public key for each message from the public key service.

19. The non-transitory computer-readable data storage medium of claim 17, wherein the message is one of a plurality of messages that the receiving device receives from the sending device, and the OTS private key is one of a plurality of OTS private keys,
   wherein the public key is a root public key corresponding to a root hash of a binary tree including a plurality of leaf hashes, the leaf hashes corresponding to OTS public keys corresponding to the OTS private keys that the sending device uses to digitally sign the messages,
   wherein, for each message, the root public key and an authentication path from the leaf hash corresponding to the OTS public key for the message to the root hash in the binary tree are needed to authenticate the message as having been sent by the sending device,
   wherein, for each message, the receiving device receives the authentication path from the leaf hash corresponding to the OTS public key for the message to the root hash,
   and wherein the root public key is used only to authenticate the messages received from the sending device and not to authenticate messages received from other sending devices.

20. The non-transitory computer-readable data storage medium of claim 17, wherein the message is one of a plurality of messages that the receiving device receives from the sending device, and the OTS private key is one of a plurality of OTS private keys,
   wherein the public key is a root public key corresponding to a root hash of a binary tree including a plurality of leaf hashes, the leaf hashes corresponding to OTS public keys corresponding to the OTS private keys that the sending device uses to digitally sign the messages,
   wherein, for each message, the root public key, and an authentication path from the leaf hash corresponding to the OTS public key for the message to the root hash in the binary tree are needed to authenticate the message as having been sent by the sending device,
   wherein, for each message, the receiving device receives the authentication path from the leaf hash corresponding to the OTS public key for the message to the root hash,
   and wherein the root public key is used to authenticate the messages received from the sending device as well as to authenticate messages sent by other sending devices.

* * * * *